(12) United States Patent
Hecht (10) Patent No.: US 8,308,403 B2
(45) Date of Patent: Nov. 13, 2012

(54) TOOL HOLDER

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 1258 days.

(21) Appl. No.: 12/098,111

(22) Filed: Apr. 4, 2008

(65) Prior Publication Data
US 2008/0267724 A1    Oct. 30, 2008

(30) Foreign Application Priority Data

Apr. 29, 2007   (IL) .......................................... 182859

(51) Int. Cl.
*B23B 31/103* (2006.01)
(52) U.S. Cl. ...................................... 408/239 R; 279/77
(58) Field of Classification Search .................. 408/226, 408/239 R, 239 A, 233, 185, 197; 279/77, 279/86, 93, 94
See application file for complete search history.

(56) References Cited

U.S. PATENT DOCUMENTS

| | | | | | |
|---|---|---|---|---|---|
| 1,783,541 A | * | 12/1930 | Hogg et al. | ...................... | 279/77 |
| 1,910,275 A | * | 5/1933 | Alden | .............................. | 279/77 |
| 1,979,059 A | * | 10/1934 | Wallman | .......................... | 279/77 |
| 2,107,581 A | * | 2/1938 | Parsons et al. | ................... | 279/76 |
| 2,154,738 A | * | 4/1939 | Reuen | .............................. | 279/76 |
| 2,395,570 A | * | 2/1946 | McKenna | ....................... | 407/95 |
| 2,431,852 A | * | 12/1947 | Weld | ............................... | 407/87 |
| 2,433,127 A | * | 12/1947 | Kinzbach | ........................ | 279/77 |
| 2,500,420 A | * | 3/1950 | Koning | ............................ | 279/76 |
| 2,524,707 A | * | 10/1950 | Koeln | ........................... | 175/299 |
| 2,580,930 A | * | 1/1952 | Kost | ................................. | 279/30 |
| 2,682,414 A | * | 6/1954 | Richardson | ..................... | 279/77 |
| 2,695,788 A | * | 11/1954 | Baier | .............................. | 279/77 |
| 2,781,199 A | * | 2/1957 | Veldhuizen | ..................... | 279/77 |
| 2,816,770 A | * | 12/1957 | De Vlieg et al. | ................ | 279/97 |
| 3,202,433 A | * | 8/1965 | Davis | ........................ | 279/105.1 |
| 3,289,678 A | * | 12/1966 | Fassbender | ................ | 131/198.2 |
| 3,545,319 A | * | 12/1970 | Anderson et al. | ............... | 82/158 |
| 3,577,810 A | * | 5/1971 | Eckle | ............................ | 408/162 |
| 3,729,806 A | * | 5/1973 | Bronne et al. | ........... | 29/890.031 |
| 3,997,951 A | | 12/1976 | Williscraft | | |
| 4,377,100 A | * | 3/1983 | Wallis | ........................ | 83/698.31 |
| 4,558,620 A | * | 12/1985 | Wallis | ........................ | 83/699.31 |
| 4,602,899 A | | 7/1986 | Vig | | |
| 4,809,995 A | * | 3/1989 | Ramunas | ........................ | 279/77 |

(Continued)

FOREIGN PATENT DOCUMENTS

EP    1 495 822    1/2005

OTHER PUBLICATIONS

International Search Report and Written Opinion in PCT/IL2008/000462, dated Oct. 14, 2008.

*Primary Examiner* — Andrea Wellington
*Assistant Examiner* — Sara Addisu
(74) *Attorney, Agent, or Firm* — Womble Carlyle (57) ABSTRACT

A tool holder for holding a shank of a cutting member. The tool holder has a socket for receiving the shank and a set screw rotatable in a set screw hole to advance along a first direction; and at least one clamping member that applies a force to the shank along a second direction responsive to advance of the set screw in the first direction to clamp the shank in the socket.

27 Claims, 9 Drawing Sheets

U.S. PATENT DOCUMENTS

| | | | |
|---|---|---|---|
| 5,033,920 A * | 7/1991 | Cantanese | 408/239 R |
| 5,284,069 A * | 2/1994 | Wellman | 76/107.1 |
| 5,348,319 A * | 9/1994 | Stolzer | 279/77 |
| 5,452,631 A * | 9/1995 | Erickson | 82/160 |
| 5,735,649 A | 4/1998 | Boscarino et al. | |
| 5,842,278 A * | 12/1998 | Gmeilbauer | 30/277.4 |
| 5,853,271 A | 12/1998 | Schanz | |
| 5,873,682 A * | 2/1999 | Tripsa | 407/101 |
| 5,873,684 A * | 2/1999 | Flolo | 409/66 |
| 6,109,152 A | 8/2000 | Hecht | |
| 6,409,435 B1 * | 6/2002 | Kocherovsky et al. | 407/104 |
| 6,517,296 B2 * | 2/2003 | Newmark | 408/82 |
| 6,599,060 B2 | 7/2003 | Hecht | |
| 7,112,020 B2 * | 9/2006 | Sheffler et al. | 409/234 |
| 7,431,539 B2 * | 10/2008 | Erickson et al. | 407/104 |
| 2002/0131831 A1 | 9/2002 | Shimomura et al. | |
| 2005/0238451 A1 | 10/2005 | Hartman | |

\* cited by examiner

TOOL HOLDER

FIELD OF THE INVENTION

The invention relates tool holders for holding a shank of a tool, such as a cutting tool in general and a cutting tool for internal turning or boring in particular.

BACKGROUND OF THE INVENTION

Several factors must be considered in order to optimize internal turning or boring. One factor is the limited space inside the workpiece which affects the design of the cutting tool in order to obtain an optimum balance between maximum strength/rigidity of the boring bar and minimum volume of the boring bar. Other important factors are chip flow and tool vibration both of which concern the position of the cutting edge in the limited space in workpiece. A known positioning solution involves the provision of a bar, which is substantially cylindrical in cross section ring bars having one or more longitudinal planar surfaces which are parallel to the longitudinal axis of the bar. The planar surfaces are often used to releasably secure the rotational position of the bar in the tool holder with at least one clamping device such as a clamping bolt. The clamping ends of the clamping bolts typically abut the planar surfaces of the boring bar. This design considerably effects and limits possible positioning of the boring bar in the tool holder and consequently effects shape and size of the cutting tool. Furthermore, changing boring bars typically involves screwing and unscrewing of more than clamping device. Thus, there is a need for improvements in these types of boring tools, and this is provided by the present invention.

SUMMARY OF THE INVENTION

In one aspect, the present invention is directed to a tool holder. The tool holder comprising a shank socket suitable for receiving a tool shank, the shank socket having a socket axis extending in a first direction; a first hole extending in a second direction and intersecting the shank socket; and a set screw hole extending in a third direction and communicating with the first hole. The tool holder further includes a first clamping member occupying the first hole and at least partially intersecting the shank socket; and a set screw occupying the set screw hole, the set screw being operatively connectable to the first clamping member. In such a tool holder, the first clamping member is rotatably adjustable within the first hole upon rotation of the set screw, from a non-clamping position to a clamping position.

The first and second directions may be mutually orthogonal to one another. Optionally The first, second and third directions may be mutually orthogonal to one another.

The tool holder may further include at least one force transmitting body in abutment with both the set screw and the first clamping member, when the first clamping member is moved from a non-clamping position to a clamping position. If desired, the at least one force transmitting body may have a spherical shape.

The tool holder may further comprise a locking pin hole intersecting the first hole, and a locking pin occupying the locking pin hole. The locking pin may be engaged to said first clamping member, such that said first clamping member is prevented from being withdrawn from the first hole while still being able to rotate within the first hole. The first clamping member may comprise a locking groove, and the locking pin engages the locking groove of the first clamping member.

The tool holder may further comprises a stop hole intersecting the shank socket and a stop pin occupying the stop hole, the stop pin providing a stop within the shank socket, such that insertion of a shank into the shank socket is limited upon abutment of the shank with the stop pin.

The first clamping member may comprise a swivel rod.

The tool holder may further comprise a second hole extending in said second direction and intersecting the shank socket, and a second clamping member; wherein the second clamping member is rotatably adjustable within the second hole, upon rotation of the set screw within the set screw hole.

The first clamping member and the second clamping member may rotate in opposite directions, upon rotation of the set screw within the set screw hole. A single set screw may simultaneously abut both the first clamping member and the second clamping member.

The first clamping member may comprise a first clamping surface and a first abutment surface, with the set screw in abutment with the first abutment surface, when the first clamping member is in the clamping position. The first clamping surface and first abutment surface may be planar. The first clamping surface and the first abutment surface may be angled with respect to each other. The angle between the first clamping surface and the first abutment surface may be less than 90°, less than 60°, and in some embodiments may be approximately 45°.

The first clamping member may further comprise a first clamping edge associated with said first clamping surface.

In another aspect, the present invention is directed to a cutting tool comprising the aforementioned tool holder with a cutting member having a shank occupying the shank socket. In such case, the first clamping member is rotatably adjustable within the first hole upon rotation of the set screw from a non-clamping position in which the shank is loosely retained in the shank socket, to a clamping position in which the first clamping member clamps and firmly retains the shank in the shank socket.

In such a cutting tool having the shank occupying the shank socket, the first clamping member may comprise a first clamping surface and a first abutment surface; and the set screw may be abutment with the first abutment surface, when the first clamping member is in the clamping position.

Additionally, the first clamping member may further comprise a first clamping edge associated with said first clamping surface, the first clamping edge being brought into contact with the shank, when the first clamping member is in the clamping position.

The cutting tool may further include a second such clamping member occupying a second such hole.

In some embodiments of the invention, the at least one clamping member is spring loaded so as to bias the clamping member such that it does not substantially interfere with insertion of the shank into the socket.

BRIEF DESCRIPTION OF THE FIGURES

The invention will be more clearly understood by reference to the following description of preferred embodiments thereof read in conjunction with the figures attached hereto. In the figures, identical structures, elements or parts, which appear in more than one figure, are generally labeled with a same numeral in all the figures in which they appear. Dimensions of components and features shown in the figures are chosen for convenience and clarity of presentation and are not necessarily shown to scale. The figures are listed below.

DETAILED DESCRIPTION OF THE INVENTION

Figure 1A:
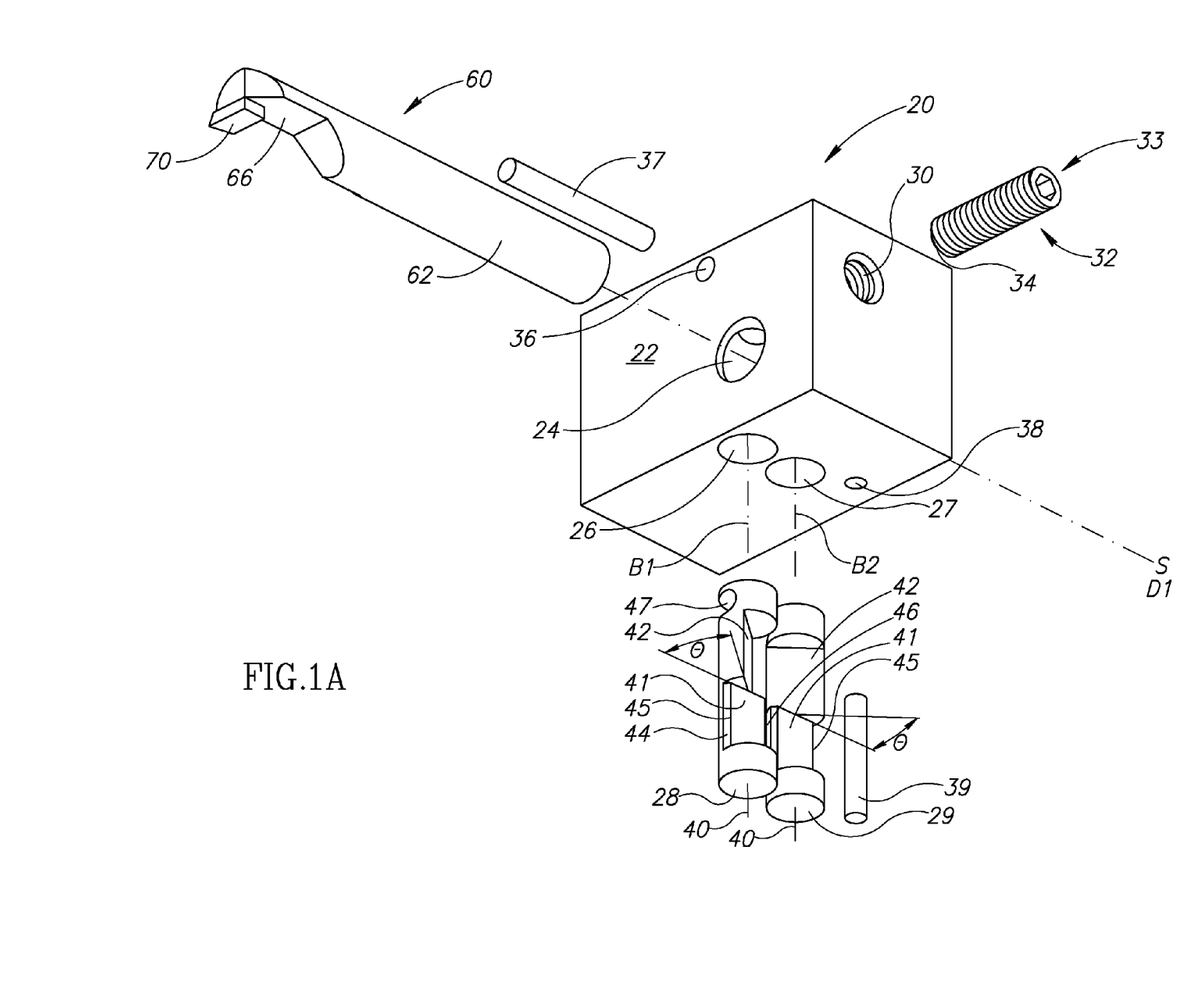
FIGS. 1A and 1B schematically show exploded perspective views of a tool holder, in accordance with an embodiment of the invention.
Figure 1B:
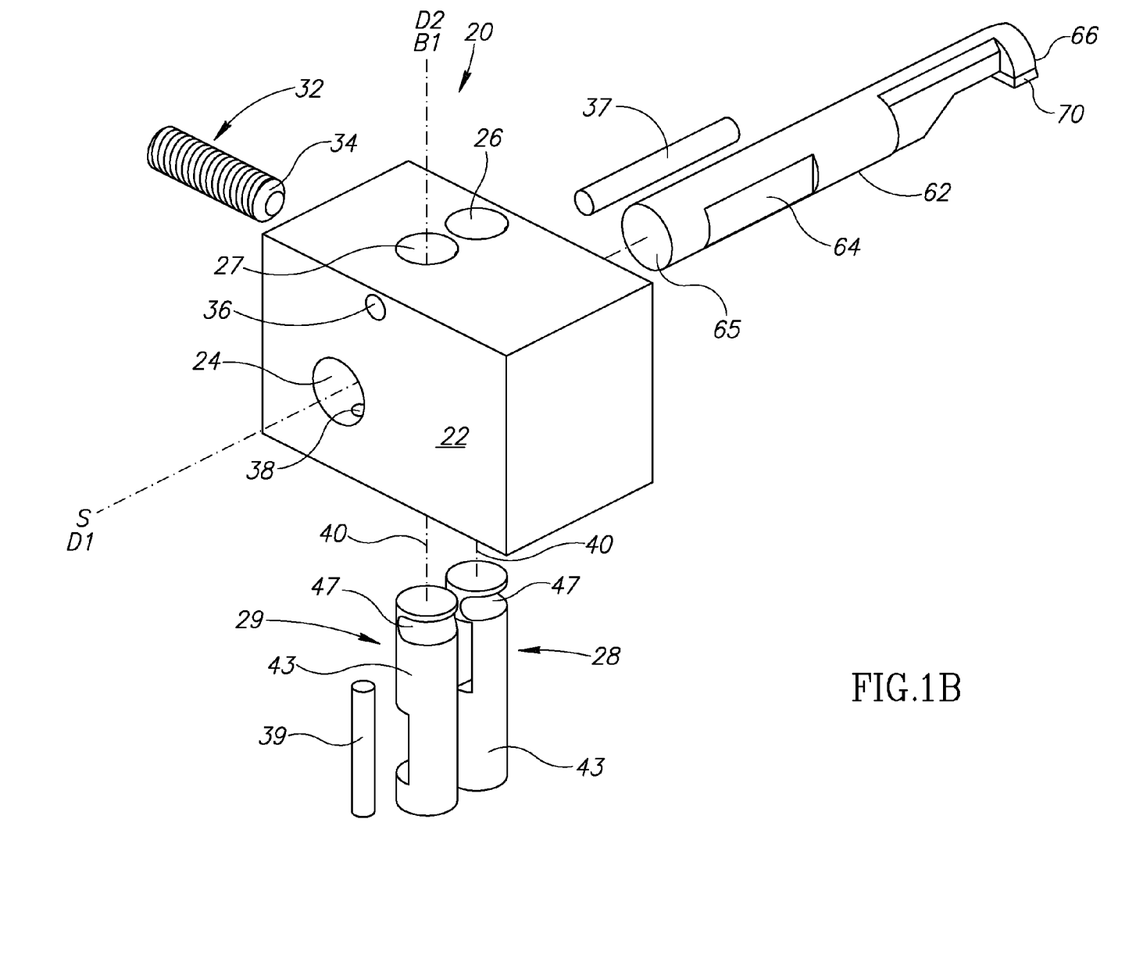

FIGS. 1A and 1B schematically show perspective exploded schematic views of a cutting tool 20 comprising a cutting member 60 attached to a tool holder 22, in accordance with an embodiment of the invention. The cutting member 60 may be, for example, boring bar or a minibar 60. According to an embodiment shown in FIG. 1, the cutting member 60 is a boring bar 60 but other embodiments of the invention include any cutting member 60 that is releasably secured in a tool holder by its shank.

The boring bar 60 has a shank 62 having an abutment surface 64 (shown in FIG. 1B) and a cutting end 66 having a cutting portion 70 at an opposite end of the boring bar 60. The cutting portion 70 may have, for example; at least one brazed or otherwise attached cutting plate or at least one replaceable cutting insert. The cutting tool 20 comprises a tool holder 22 having mounting apparatus (such as, for example is described with respect to FIG. 8) in accordance with any of various devices and methods known in the art for mounting the cutting tool 20 to a machine tool, such as a lathe or boring machine, with which the cutting tool 20 is to be used.

The tool holder 22 in this embodiment is a rectangular prism. In other embodiments of the invention the tool holder may optionally have other shapes such as, for example, a cylinder, a hexagonal prism, or a sphere. Tool holder 22 has a socket 24 with a socket axis S suitable for receiving the shank 62 and extending in a first direction D1. The tool holder 22 is also provided with two generally parallel swivel holes 26 and 27 for receiving first and second clamping members, formed in one embodiment as swivel rods 28 and 29, respectively. The swivel holes 26, 27 have a bore axis B1 and B2 respectively extending in a second direction D2 and intersect the socket 24. In another optional embodiment the tool holder may comprise only one a swivel bore for receiving only one clamping member, formed in one embodiment as a swivel rod. In another optional embodiment (not shown) the bore axes B1 and B2 of the swivel holes 26, 27 respectively are not parallel forming an angle between them. An angle bisector of the angle between the bore axes B1 and B2 extends in the second direction D2.

The tool holder 22 also includes a threaded set screw hole 30 for receiving a set screw 32 having a clamping end 34. Set screw hole 30 has a hole axis H extending in a third direction D3 from an opening 31 in a surface of the tool holder 22 and communicates with the swivel holes 26, 27. The set screw 32 occupies the set screw hole 30 and is operatively connectable to the swivel rods 28 and 29. The set screw 32 has a clamping end 34 and a torque transmitter 33 at an opposing free end. In particular and as further discussed below, the swivel rods 28 and 29 are rotatably adjustable within the swivel holes 26, 27, from a non-clamping position to a clamping position.

From the foregoing, it can be seen that swivel holes 26 and 27 transversely intersect socket 24 and are medially intersected by set screw hole 30. Because of the intersecting nature of the socket 24, the swivel holes 26, 27 and the set screw hole 30, the first and second directions D1 and D2 are mutually generally orthogonal to one another. In some embodiments, the first, second and third directions D1, D2, and D3 are mutually generally perpendicular to one another.

Optionally, tool holder 22 has a locking pin hole 36 for receiving a locking pin 37 that intersects swivel holes 26 and 27. Locking pin 37 is inserted in locking pin hole 36 when swivel rods 28 and 29 are positioned in swivel holes 26 and 27, respectively. As discussed further below, locking pin 37 engages swivel rods 28 and 29 to lock the swivel rods in the swivel holes.

Optionally, tool holder 22 is formed with at least one stop hole 38 for receiving a stop pin 39. Stop hole 38 intersects the socket 24. By way of example tool holder 22 is formed with a single stop hole 38. Stop pin 39 in stop hole 38 provides a stop which determines a maximum distance to which boring bar 60 may be inserted into socket 24, the maximum distance being reached upon abutment of the shank 62 with the stop pin 39. The locking pin hole 36 and stop hole 38 are adapted to receive the locking pin 37 and the stop pin 39. In the embodiment shown in FIGS. 1A-1B the locking pin 37 and the stop pin 39 are generally cylindrical. In other optional embodiments the locking pin 37 and the stop pin 39 may optionally have other shapes for instance an elongated prism such as a rectangular, triangular or hexagonal prism. Optionally, the stop pin 39 and locking pin 37 are press fit into their respective holes. For embodiments of the invention having a plurality of stop holes, a stop pin similar to stop pin 39 that can be inserted in different stop holes and relatively easily be removed from a stop hole in which it is inserted is optionally provided. Inserting the stop pin in different stop holes sets different maximum depths to which the boring bar 60 can be inserted into socket 24.

Swivel rods 28 and 29 are optionally, mirror image rods that are generally similar and so only swivel rod 28 one will be described. Swivel rod 28 has a longitudinal axis 40 and may be generally cylindrical with a circumference surface 43. The swivel rod 28 further has a clamping surface 41 and/or an abutment surface 42. Optionally the clamping and/or the abutment surfaces 41 and 42 are planar. Optionally, the clamping and/or the abutment surfaces 41 and 42 of the swivel rod 28 are generally parallel to the axis 40. The abutment surface 42 may be angled with respect to the clamping surface 41 by an angle θ having a magnitude less than 90°. Optionally, the angle θ has a value less than or equal to about 60° degrees. Optionally, the angle θ is equal to substantially 45°. The junction of the clamping surface 41 and the circumference surface 43 define a generally longitudinal clamping edge 45 on either side of the clamping surface 41. Optionally, in another embodiment of the invention, a generally longitudinal bevel 44 extends between the clamping surface 41 and the circumference surface 43 on one side of the clamping surface 41 and a generally longitudinal bevel 46 that is generally parallel to the bevel 44 extends between the clamping surface 41 and the circumference surface 43 on the other side of the clamping surfcase 41. In this embodiment the bevel 44 meets the clamping surface 41 to define the clamping edge 45. The swivel rod 28 may optionally have at least one generally latitudinal locking groove 47. The locking groove 47 may optionally be diametrically opposed while optionally longitudinally displaced and generally parallel the clamping surface 41.

Figure 2:
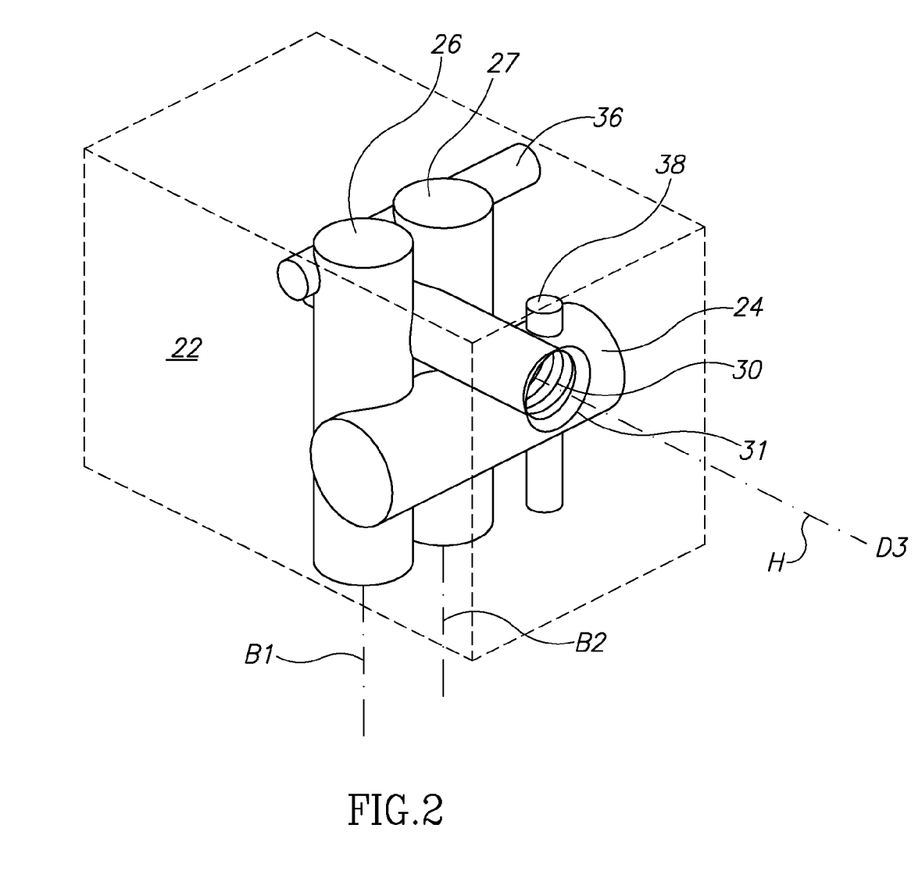
FIG. 2 schematically shows internal features of the tool holder shown in FIGS. 1A and 1B.

FIG. 2 shows the relative positions of some of the internal features of the tool holder 22: the socket 24, the swivel bores 26 and 27, the set screw hole 30, the locking pin hole 36 and stop hole 38. For convenience of presentation, to show relationships between various holes and socket formed in tool holder 22, FIG. 2 schematically shows tool holder 22 in dashed lines and socket 24, swivel holes 26 and 27, and stop and locking pin holes 38 and 36 in solid lines. The socket 24 is at least partially intersected by the stop hole 38. In the embodiment shown, the stop hole 38 is generally parallel to the second direction D2 however, the stop hole 38 may optionally be otherwise oriented for instance generally parallel to a plane defined by the second direction D2 and the third direction D3, generally parallel to the first direction D1. Swivel bores 26 and 27 transversely intersect socket 24 and are medially intersected by set screw hole 30. The locking pin hole 36 may be generally parallel to the first direction D1 and transversely partially intersects the swivel bores 26 and 27.

Figure 3:
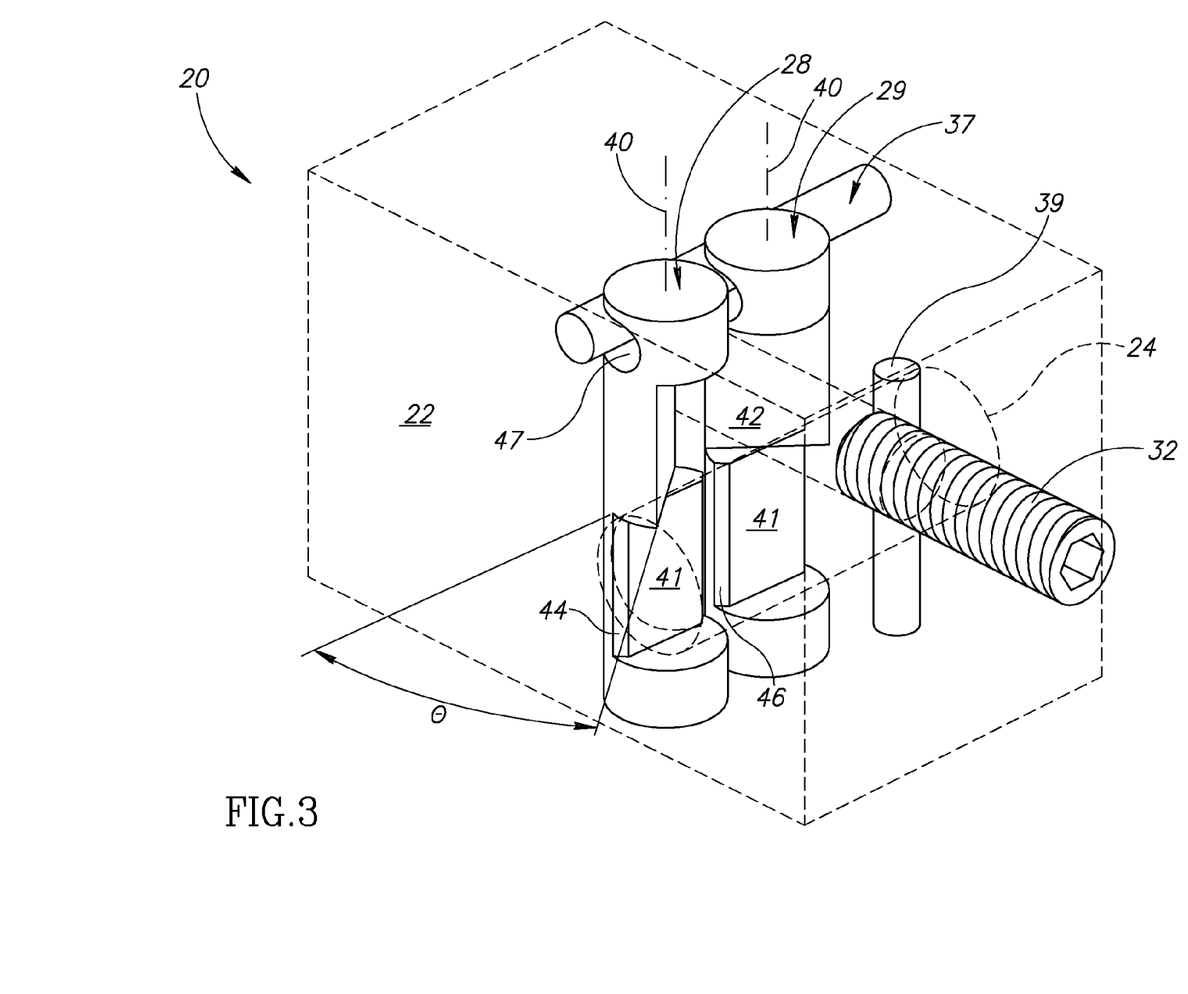
FIG. 3 schematically shows a perspective view of the partially assembled tool holder shown in FIGS. 1A and 1B.
Figure 4:
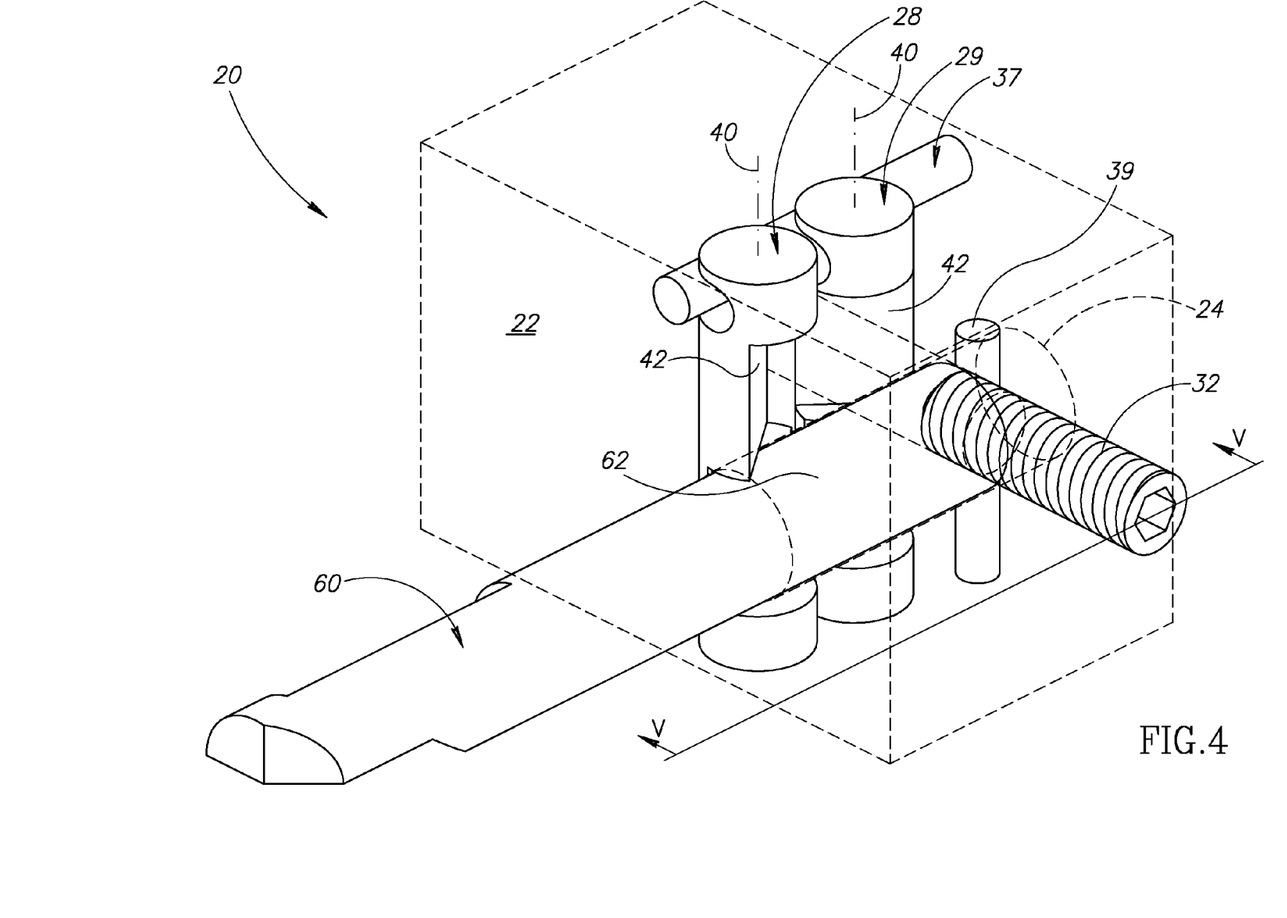
FIG. 4 schematically shows a boring bar inserted into a bar socket of the tool holder shown in FIG. 3 prior to the boring bar being clamped in the bar socket.
Figure 5:
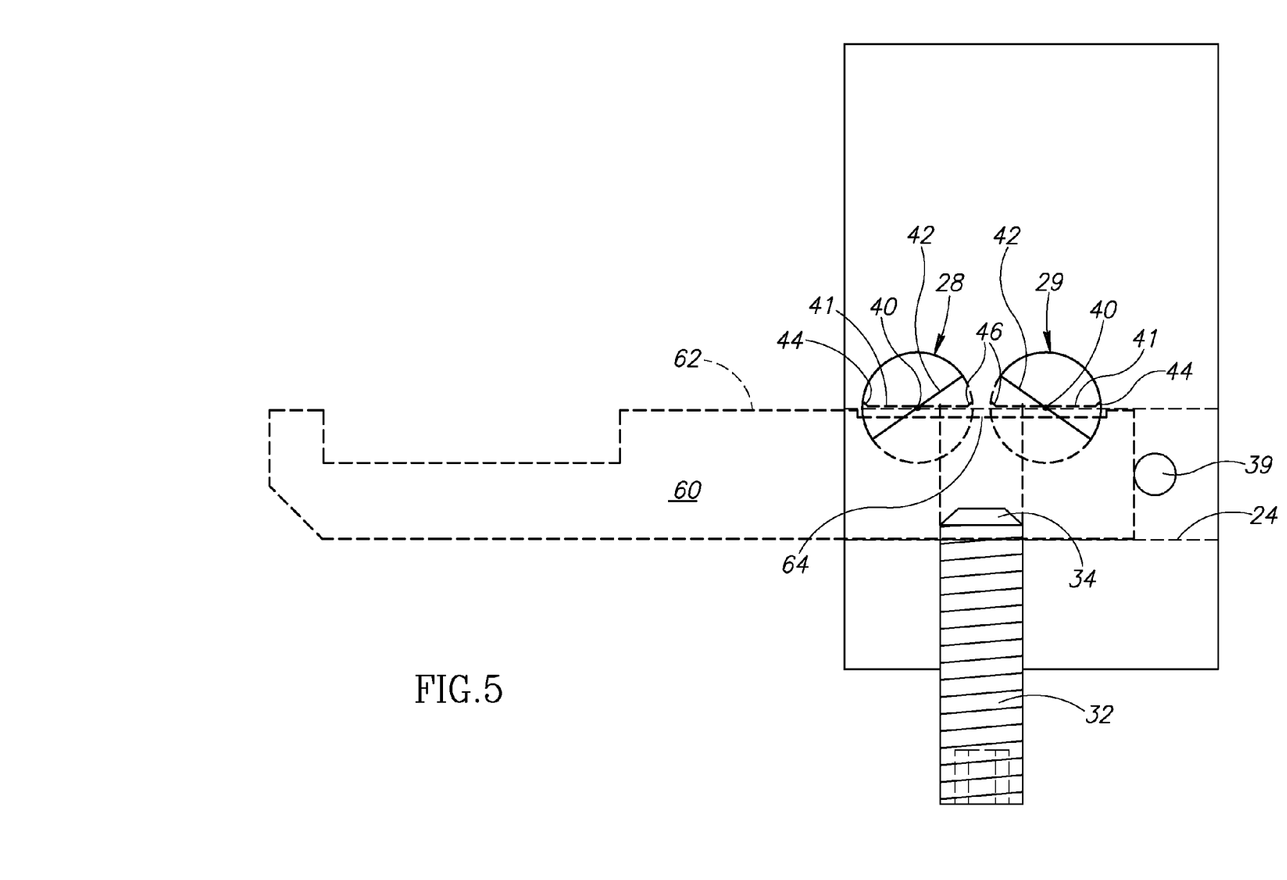
FIG. 5 schematically shows a partial section view of the tool holder and boring bar shown in FIG. 4, along section line V-V.

FIGS. 3-5 schematically show a partially assembled cutting tool 20 which is in a non-clamping or free position. Swivel rods 28 and 29 are positioned in the swivel holes 26 and 27 so that their locking grooves 47 are at the intersection of the swivel holes 26 and 27 and the locking pin hole 36 respectively while their clamping surfaces 41 are at the intersection of the swivel holes 26 and 27, respectively, with the socket 24 and are generally parallel the socket axis S. In this position the clamping edges 45 of the swivel rods 28 and 29 do not partially obstruct or block the socket 24. Locking pin 37 is positioned in locking pin hole 36 to lock the swivel rods 28 and 29 in the swivel holes 26 and 27 while allowing limited rotation of the swivel rods 28 and 29 in the swivel holes 26 and 27 about their respective axes 40 from the free position of the swivel rods 28 and 29 to a clamping position of the swivel rods 28 and 29 that will be defined below. In particular, the locking pin is 37 is engaged to the swivel rods 28, 29 such that the latter are prevented from being withdrawn from their respective swivel holes 26, 27. The stop pin 39 is positioned in the stop hole 38. Optionally, the swivel rods 28 and 29, the locking pin 37 and the stop pin 39 may be press fit into their respective holes. The set screw 32 is threadingly engaged in the set screw hole 30 so that the clamping end 34 is facing the intersection of the set screw hole 30 with the swivel bores 26 and 27.

In the free position, the boring bar 60 may be freely inserted into the socket 24 until it abuts the stop pin 39 and it may be freely extracted from the socket 24. Set screw 32 may be partially screwed inwardly into the set screw hole 30. The swivel rods 28 and 29 remain in the free position as long as the clamping end 34 of the set screw 32 does not contact the abutment surfaces 42 of swivel rods 28 and 29 and the clamping edges 45 of swivel rods 28 and 29 do not contact abutment surface 64 of boring bar 60.

It is noted that bevel 44 and bevel 46 enable relatively unhindered insertion and extraction of the boring bar 60 in and from the socket 24. In some embodiments of the invention, to facilitate relatively unhindered insertion of boring bar 60 into socket 24 and unhindered extraction of the boring bar 60, rods 28 and 29 are spring loaded so that they are biased into non-clamping positions when not rotated by set screw 32. A torsion spring, or the like, may be operatively connected to each of the rods 28, 29, thereby biasing the rods towards the non-clamping position. In some embodiments, each rod is provided with two torsion springs at points on either side of the socket 24. In some embodiments, the same spring, or springs, is used to bias both rods 28, 29.

Figure 6:
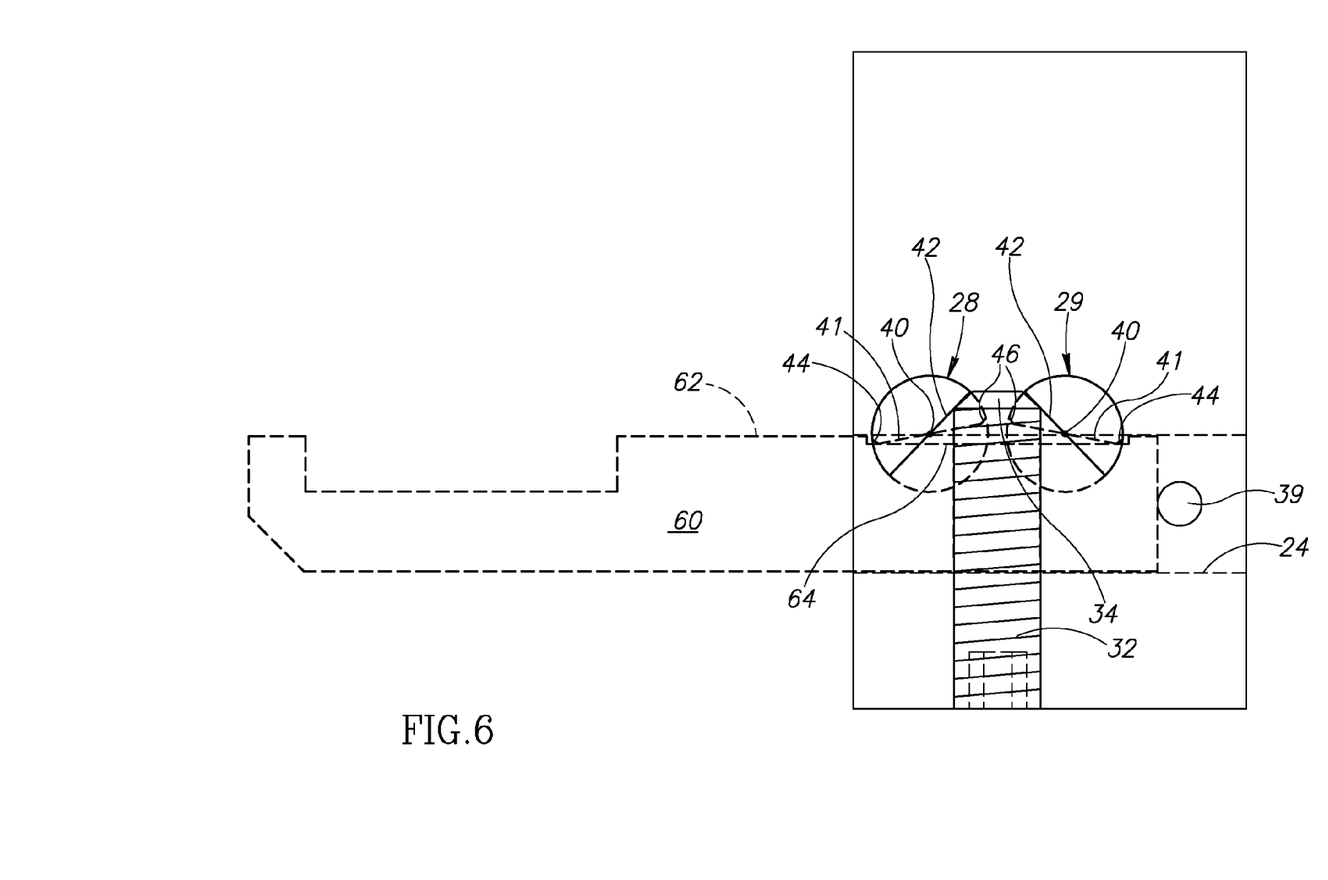
FIG. 6 schematically shows a partial section view of the tool holder and boring bar shown in FIG. 4 along section line V-V with the boring bar clamped in the bar socket.

FIG. 6 shows the clamping position of swivel rods 28 and 29. In the clamping position, the clamping edges 45 of swivel rods 28 and 29 abut the abutment surface 64 of boring bar 60. The set screw 32 is screwed inwardly into set screw hole 30 to a depth at which clamping end 34 of the set screw 32 applies force to abutment surfaces 42 of swivel rods 28 and 29. Clamping end 34 of the single set screw 32 simultaneously contacts and abuts at least a portion of the abutment surfaces 42 of both swivel rods 28 and 29. As the set screw 32 is rotated and advanced further inwardly into the set screw hole 30 in the third direction D3, the resulting moment rotates the swivel rods 28, 29 in opposite directions, bringing the clamping edge 45 of the clamping surface 41 of each swivel rod 28, 29 in a direction opposite the set screw 32 and into contact with spaced apart portions of the abutment surface 64 of boring bar 60. As set screw 32 is screwed further inwardly into set screw hole 30, the force with which each clamping edge 45 presses abutment surface 64 further increases and clamps boring bar 60 securely in socket 24.

Thus, the set screw 32 contacts the swivel rods 28 and 29 (that in turn clamp the boring bar 60 in the socket 24) and does not directly contact the boring bar 60. The socket 24 may be optionally positioned between the opening 31 and the swivel holes 26 and 27. Consequently the socket 24 may be closer to the opening 31 of the set screw hole 30 than would be possible if the set screw 32 directly clamped the boring bar 60. Alternatively, the swivel holes 26 and 27 may be optionally positioned, if desired, between the socket 24 the opening 31 without affecting the length of the set screw 32 (or the set screw hole 30) of this embodiment. Additionally, in view of the fact that the single set screw 32 simultaneously rotates the swivel rods 28, 29 (thus clamping the boring bar 60 with spaced apart portions of the abutment surface 64), It is noted that there are frictional forces between the surface of the clamping end 34 and the abutment surfaces 42 during contact. The frictional forces generate torque that opposes rotation of set screw 32 and the torque increases as the set screw 32 is screwed deeper into set screw hole 30. Furthermore, the set screw 32 remains in abutment with the abutment surfaces 42, when the swivel rods 28, 29 are in the clamping position.

Figure 7:
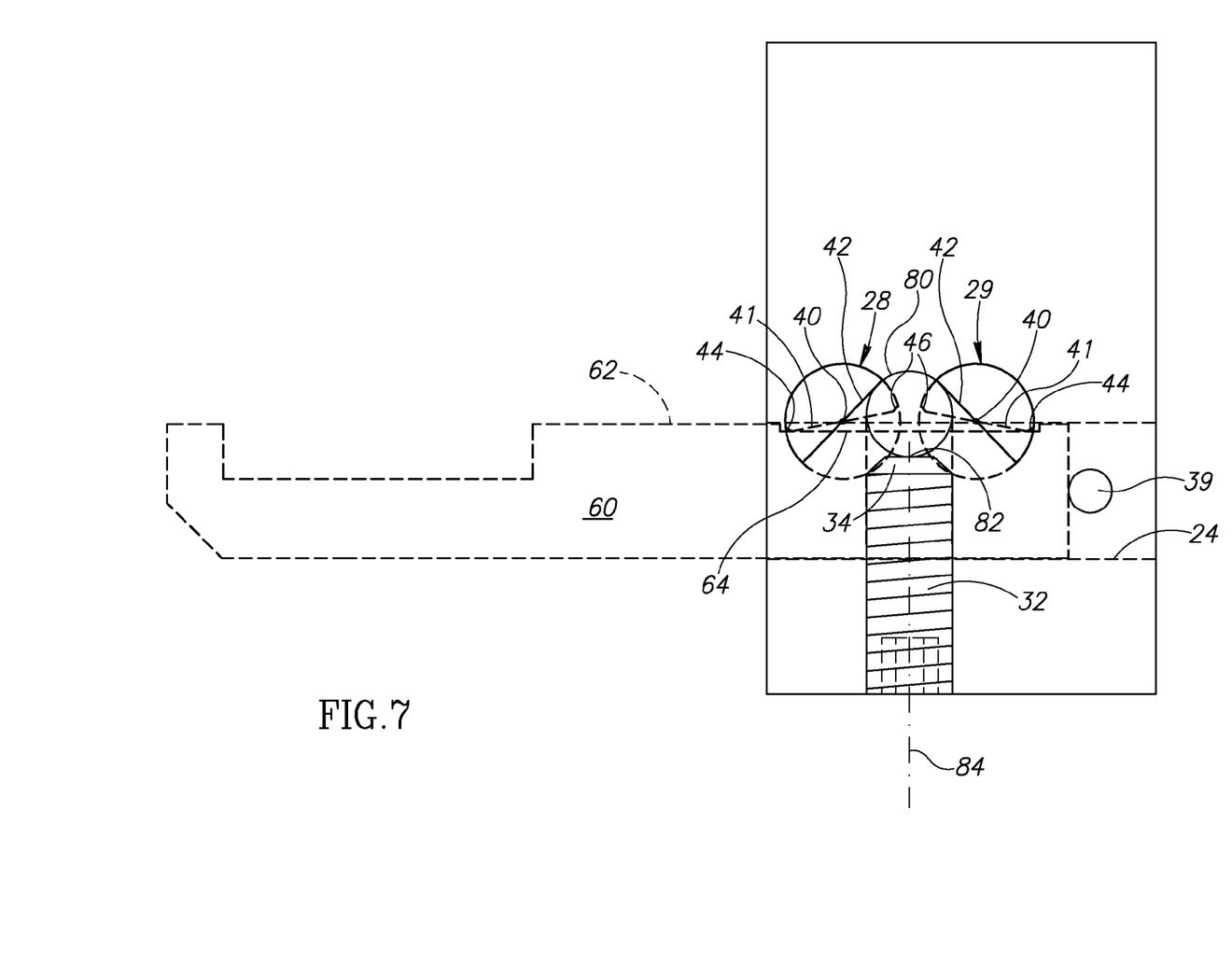
FIG. 7 schematically shows a tool holder similar to that shown in FIG. 6 having an intermediate force transmitting body, in accordance with an embodiment of the invention.

FIG. 7 schematically shows a cross-section view of an assembled cutting tool 20 in accordance with another embodiment of the invention having a force transmitting body 80 for reducing friction between clamping end 34 of set screw 32 and abutment surfaces 42. In the embodiment shown, the force transmitting body 80 has a spherical shape and a contact surface 82 centrally located on the clamping end 34 of set screw 32 contacts sphere 80. As seen in FIG. 7, when the swivel rods 28, 29 are in the clamping position, the force transmitting body 80 is in abutment with both the set screw 32 and the swivel rods 28, 29.

The components in the following embodiments that are similar to respective components described above will be referred to herein below by reference numerals which are shifted by 200 from those of the cutting tool 20. A cutting tool in accordance with another embodiment of the invention similar to cutting tool 20 can be particularly advantageous for machining configurations, such as, by way of example, a configuration shown in FIG. 8, in which it is inconvenient to secure a tool shank having an abutment surface to a tool holder by tightening a set screw in the tool holder on a same side as the abutment surface.

Figure 8:
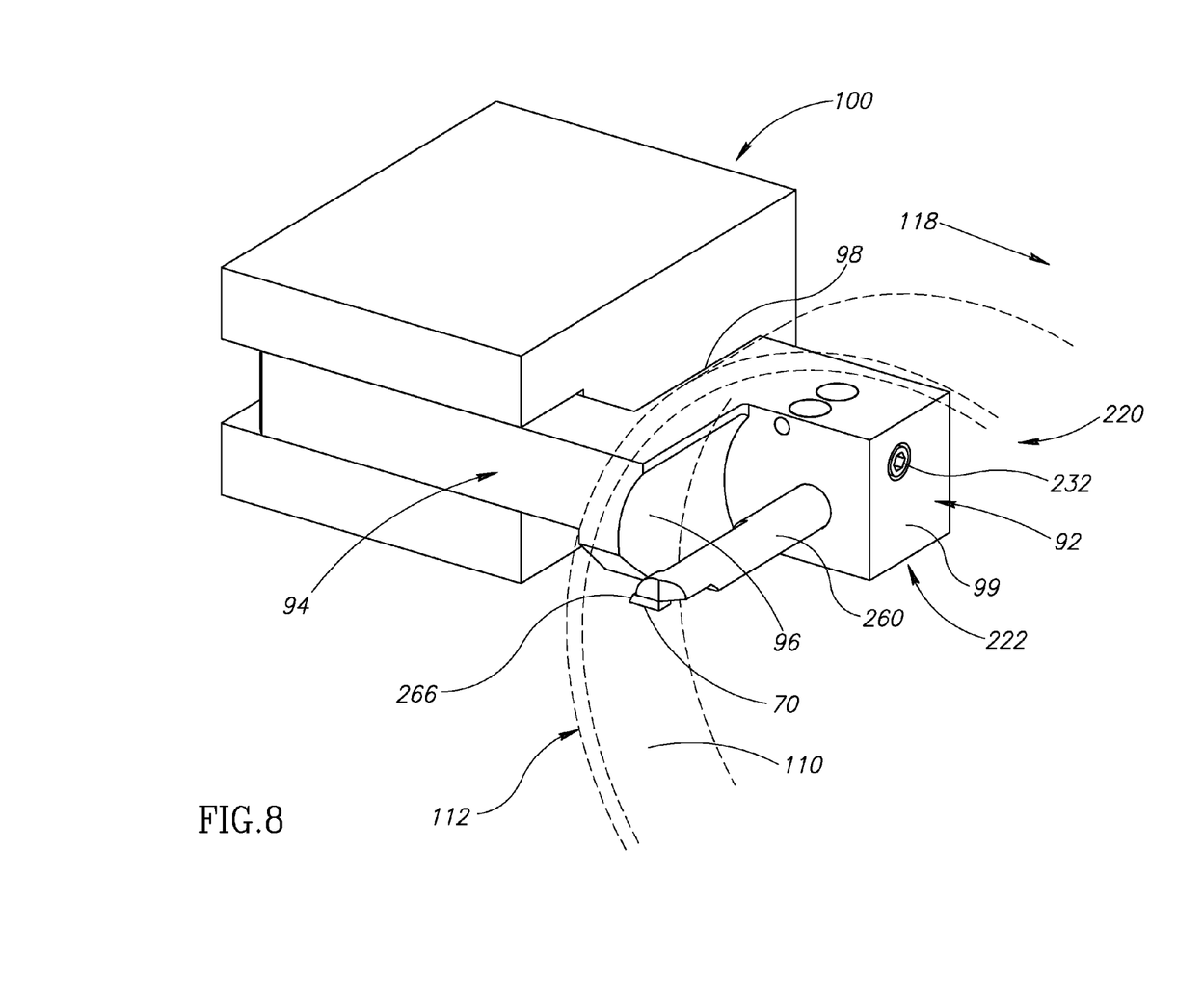
FIG. 8 schematically shows another tool holder, in accordance with an embodiment of the invention.

FIG. 8 schematically shows a cutting tool 220 comprising a tool holder 222 similar to tool holder 22 shown in FIG. 1A-FIG. 7, and a cutting member, such as, for example, a boring bar 260 in accordance with an embodiment of the invention. Tool holder 222 comprises an L shaped support arm 94 having a cylindrical face surface 96 that faces in a forward direction 118 of the cutting tool 220. Support arm 94 by way of example, is mounted to a mounting head 100 of a lathe (not shown) to mount the tool holder to the lathe. A boring bar 260 having a cutting portion 266 is held in tool holder 222 and, by way of example, the lathe is being used to turn an inside surface 110 of a cylindrical work piece 112, only a portion of which is shown.

When inserted in the tool holder 222, as shown in FIG. 8, the boring bar 260 has an abutment surface (not shown) that faces the mounting head 100 in a rearward direction of the cutting tool 220. Because of the sizes and shapes of the mounting head 100 and the tool holder 222, the mounting head 100 blocks access to a side 98 of the tool holder 222. As a result, it is inconvenient to secure the boring bar 260 to the tool holder 222 by tightening a set screw 232 from side 98 once the tool holder 222 is mounted to mounting head 100, or to adjust the position of the boring bar 260 or replace it with another, once the cutting tool 220 is mounted to the mounting head. Because the tool holder 222 is configured, in accordance with an embodiment of the invention, to secure a boring bar from a side 99 opposite to side 98, which side 98 faces the abutment surface, the boring bar 260 is conveniently secured to the tool holder 222 and may readily have its position adjusted or be exchanged for another.

The invention has been described using detailed descriptions of embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons of the art. The scope of the invention is limited only by the claims.

What is claimed is:

1. A tool holder comprising:
   a socket suitable for receiving a cutting member shank, the socket having a socket axis S extending in a first direction;
   a first hole having a first bore axis, the first hole extending in a second direction and intersecting the shank socket; and
   a set screw hole extending in a third direction and communicating with the first hole;
   a first clamping member occupying the first hole and at least partially intersecting the socket, the first clamping member having a first longitudinal axis which extends along the first bore axis; and
   a set screw occupying the set screw hole and operatively connectable to said first clamping member;
   wherein the first clamping member is configured to rotate around its longitudinal axis within the first hole upon rotation of the set screw, from a non-clamping position to a clamping position.

2. The tool holder according to claim 1, wherein the first and second directions are mutually orthogonal to one another.

3. The tool holder according to claim 2, wherein the first, second and third directions are mutually perpendicular to one another.

4. The tool holder according to claim 1, further comprising:
   at least one force transmitting body in abutment with both the set screw and the first clamping member, when the first clamping member is in the clamping position.

5. The tool holder according to claim 4, wherein the at least one force transmitting body has a spherical shape.

6. The tool holder according to claim 1, further comprising a locking pin hole intersecting the first hole and a locking pin occupying the locking pin hole, the locking pin being engaged to the first clamping member, such that said first clamping member is prevented from being withdrawn from the first hole while still being able to rotate within the first hole.

7. The tool holder according to claim 6, wherein:
   said first clamping member comprises a locking groove; and
   said locking pin engages the locking groove of said first clamping member.

8. The tool holder according to claim 1, further comprising a stop hole intersecting the socket and a stop pin occupying the stop hole, the stop pin providing a stop within the socket, such that insertion of a shank into the socket is limited upon abutment of the shank with the stop pin.

9. The tool holder according to claim 1, wherein the first clamping member comprises a swivel rod.

10. The tool holder according to claim 1, further comprising:
    a second hole having a second bore axis, the second hole extending in said second direction and intersecting the socket; and
    a second clamping member occupying the second hole and at least partially intersecting the socket, the second clamping member having a second longitudinal axis which extends along the second bore axis;
    wherein the second clamping member is configured to rotate around its longitudinal axis within the second hole, upon rotation of the set screw within the set screw hole.

11. The tool holder according to claim 10, wherein the first clamping member and the second camping member rotate in opposite directions, upon rotation of the set screw within the set screw hole.

12. The tool holder according to claim 11, wherein a single set screw simultaneously abuts both the first clamping member and the second clamping member.

13. The tool holder according to claim 1, wherein:
    the first clamping member comprises:
      a first clamping surface; and
      a first abutment surface; and
    the set screw is in abutment with the first abutment surface, when the first clamping member is in the clamping position.

14. The tool holder according to claim 13, wherein the first clamping surface and first abutment surface are planar.

15. The tool holder according to claim 14, wherein the first clamping surface and the first abutment surface are angled with respect to each other.

16. The tool holder according to claim 15, wherein the angle between the first clamping surface and the first abutment surface is less than 90°.

17. The tool holder according to claim 16, wherein the angle between the first clamping surface and the first abutment surface is less than 60°.

18. The tool holder according to claim 17, wherein the angle between the first clamping surface and the first abutment surface is approximately 45°.

19. A cutting tool comprising:
a tool holder comprising:
  a socket suitable for receiving a cutting member shank, the socket having a socket axis extending in a first direction;
  a first hole having a first bore axis, the first hole extending in a second direction and intersecting the shank socket; and
  a set screw hole extending in a third direction and communicating with the first hole;
a first clamping member occupying the first hole and at least partially intersecting the socket, the first clamping member having a first longitudinal axis which extends along the first bore axis;
a set screw occupying the set screw hole, the set screw being operatively connected to said first clamping member; and
a cutting member having a shank occupying the socket;
wherein the first clamping member is configured to rotate around its first longitudinal axis within the first hole upon rotation of the set screw:
  from a non-clamping position in which the shank is loosely retained in the socket;
  to a clamping position in which the first clamping member clamps and firmly retains the shank in the socket.

20. The cutting tool according to claim 19, wherein:
the first clamping member comprises:
  a first clamping surface; and
  a first abutment surface; and
the set screw is in abutment with the first abutment surface, when the first clamping member is in the clamping position.

21. The cutting tool according to claim 20, wherein:
the first clamping member further comprises a longitudinal first clamping edge extending along the first longitudinal axis, the first clamping edge being associated with said first clamping surface; and
the first clamping edge is brought into contact with the shank, when the first clamping member is in the clamping position.

22. The cutting tool according to claim 19, wherein:
the tool holder has a second hole having a second bore axis, the second hole extending in said second direction and intersecting the socket;
a second clamping member occupies the second hole and at least partially intersects the socket, the second clamping member having a second longitudinal axis which extends along the second bore axis; and
the second clamping member is configured to rotate around its longitudinal axis within the second hole upon rotation of the set screw from a non-clamping position in which the shank is loosely retained in the socket, to a clamping position in which the second clamping member clamps and firmly retains the shank in the socket.

23. A tool holder comprising:
a socket suitable for receiving a cutting member shank, the socket having a socket axis extending in a first direction;
a first hole having a first bore axis and intersecting the shank socket and a second hole having a second bore axis and intersecting the shank socket, wherein first bore axis and the second bore axis form an angle having an angle bisector extending in a second direction; and
a set screw hole extending in a third direction and communicating with the first hole and with the second hole;
a first clamping member occupying the first hole and at least partially intersecting the socket;
a second clamping member occupying the second hole and at least partially intersecting the socket; and
a set screw occupying the set screw hole, the set screw being operatively connectable to the first clamping member and to the second clamping member; wherein
the first clamping member is rotatably adjustable within the first hole and the second clamping member is rotatably adjustable within the second hole upon rotation of the set screw within the set screw hole, from a non-clamping position to a clamping position.

24. A cutting tool comprising:
a tool holder comprising:
  a socket suitable for receiving a cutting member shank, the socket having a socket axis extending in a first direction;
  a first hole having a first bore axis and intersecting the shank socket and a second hole having a second bore axis and intersecting the shank socket; wherein first bore axis and the second bore axis form an angle having an angle bisector extending in a second direction and intersecting the shank socket; and
  a set screw hole extending in a third direction and communicating with the first hole and with the second hole;
a first clamping member occupying the first hole and at least partially intersecting the socket;
a second clamping member occupying the second hole and at least partially intersecting the socket;
a set screw occupying the set screw hole, the set screw being operatively connectable to the first clamping member and to the second clamping member; and
a cutting member having a shank occupying the socket;
wherein the first clamping member is rotatably adjustable within the first hole and the second clamping member is rotatably adjustable within the second hole upon rotation of the set screw from a non-clamping position in which the shank is loosely retained in the socket to a clamping position in which the first clamping member and the second clamping member clamp and firmly retains the shank in the socket.

25. A tool holder comprising:
a socket suitable for receiving a cutting member shank, the socket having a socket axis S extending in a first direction;
a first hole extending in a second direction and intersecting the shank socket;
a first clamping member occupying the first hole and at least partially intersecting the socket;
a set screw hole extending in a third direction and communicating with the first hole; and
a set screw occupying the set screw hole and operatively connectable to said first clamping member;
wherein the first clamping member is configured to rotate within the first hole upon rotation of the set screw, from a non-clamping position to a clamping position; and
wherein the first and second directions are mutually orthogonal to one another.

26. A tool holder comprising:
a socket suitable for receiving a cutting member shank, the socket having a socket axis S extending in a first direction;
a first hole extending in a second direction and intersecting the shank socket;
a set screw hole extending in a third direction and communicating with the first hole;

a first clamping member occupying the first hole and at least partially intersecting the socket; and a set screw occupying the set screw hole and operatively connectable to said first clamping member;

wherein the first clamping member is configured to rotate within the first hole upon rotation of the set screw, from a non-clamping position to a clamping position; and wherein the first clamping member comprises a cylindrical swivel rod.

27. A tool holder comprising:

a socket suitable for receiving a cutting member shank, the socket having a socket axis S extending in a first direction;

a first hole extending in a second direction and intersecting the shank socket;

a first clamping member occupying the first hole and at least partially intersecting the socket;

a second hole extending in said second direction and intersecting the socket;

a second clamping member occupying the second hole and at least partially intersecting the socket;

a set screw hole extending in a third direction and communicating with the first hole; and a set screw occupying the set screw hole and operatively connectable to said first clamping member;

wherein the first and second clamping members are configured to rotate within resepective first and second holes, upon rotation of the set screw, from a non-clamping position to a clamping position.

* * * * *